United States Patent
Chafe

(10) Patent No.: US 7,522,734 B2
(45) Date of Patent: Apr. 21, 2009

(54) DISTRIBUTED ACOUSTIC REVERBERATION FOR AUDIO COLLABORATION

(75) Inventor: Christopher D. Chafe, Palo Alto, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 830 days.

(21) Appl. No.: 10/756,741

(22) Filed: Jan. 12, 2004

(65) Prior Publication Data

US 2004/0205204 A1 Oct. 14, 2004

Related U.S. Application Data

(63) Continuation-in-part of application No. 09/686,320, filed on Oct. 10, 2000, now Pat. No. 6,801,939.

(51) Int. Cl.
*H03G 3/00* (2006.01)

(52) U.S. Cl. .................... 381/63; 381/77; 381/82

(58) Field of Classification Search .......... 381/61–63, 381/77–80, 82, 85; 709/223–224, 218, 227, 709/231; 700/94
See application file for complete search history.

(56) References Cited

U.S. PATENT DOCUMENTS

| | | | |
|---|---|---|---|
| 4,734,934 A | 3/1988 | Boggs et al. ............... 379/202 |
| 4,817,149 A | 3/1989 | Myers .......................... 381/1 |
| 5,347,306 A | 9/1994 | Nitta ............................ 348/15 |
| 5,729,613 A * | 3/1998 | Poletti ......................... 381/63 |
| 5,812,674 A | 9/1998 | Jot et al. ...................... 381/17 |
| 5,862,233 A * | 1/1999 | Poletti ......................... 381/63 |
| 5,889,843 A | 3/1999 | Singer et al. ................ 379/202 |
| 5,901,230 A * | 5/1999 | Walker ........................ 381/66 |
| 5,991,385 A | 11/1999 | Dunn et al. .................. 379/202 |
| 6,125,115 A | 9/2000 | Smits .......................... 370/389 |
| 6,327,567 B1 * | 12/2001 | Willehadson et al. ....... 704/270 |
| 6,330,486 B1 | 12/2001 | Padula ......................... 700/94 |
| 6,353,174 B1 | 3/2002 | Schmidt et al. .............. 84/609 |
| 6,408,327 B1 | 6/2002 | McClennon et al. ........ 709/204 |
| 6,414,960 B1 * | 7/2002 | Kuhn et al. ............ 370/395.64 |
| 7,062,337 B1 * | 6/2006 | Blesser ........................ 700/94 |
| 7,212,517 B2 * | 5/2007 | Dzik ........................... 370/352 |
| 7,233,673 B1 * | 6/2007 | Poletti ......................... 381/63 |
| 2002/0013813 A1 | 1/2002 | Matsuoka ................... 709/204 |
| 2002/0106986 A1 * | 8/2002 | Asada et al. ................ 455/3.01 |
| 2002/0159603 A1 * | 10/2002 | Hirai et al. ................... 381/61 |

* cited by examiner

*Primary Examiner*—Vivian Chin
*Assistant Examiner*—Disler Paul
(74) *Attorney, Agent, or Firm*—Lumen Patent Firm

(57) ABSTRACT

A distributed acoustic reverberator including a network audio connection between at least two separated locations is provided. When a sound is emitted at one of the locations, the reverberator provides a reverberation signal to that location with a procedure. An algorithm implemented by the distributed reverberator includes such a procedure for each location. The delay of the network connection is an input to the procedures. Thus, a shared and acoustically consistent space including the separated locations is provided. The reverberator may include procedures for providing a reverberation signal to one location responsive to sound at another location.

30 Claims, 6 Drawing Sheets

DISTRIBUTED ACOUSTIC REVERBERATION FOR AUDIO COLLABORATION

CROSS REFERENCE TO RELATED APPLICATIONS

This application is a continuation in part of U.S. application Ser. No. 09/686,320 filed Oct. 10, 2000 now U.S. Pat. No. 6,801,939 and hereby incorporated by reference.

FIELD OF THE INVENTION

This invention relates to distributed audio collaboration.

BACKGROUND

As network data communication evolves toward increasing bandwidth, various new applications of data communication that exploit high-bandwidth connectivity are enabled. Such applications include audio and/or video teleconferencing or collaboration with ever-increasing fidelity.

For example, the use of binaural recording and playback to provide an audible sense of the position of participants in the conversation is one method for increasing audio teleconferencing fidelity. With such methods, participants in a teleconference can be "positioned" around a virtual conference table, and these synthetic participant positions facilitate determination of who is talking and/or picking out one conversation from several others. Examples of such developments can be found in U.S. Pat. Nos. 5,889,843, 5,9991,385, and 6,125,115.

However, binaural recording alone does not provide sufficient fidelity for more demanding audio collaboration applications, such as high-fidelity musical collaboration. Two further issues pertaining to high-fidelity audio collaboration are network latency and acoustic ambience. Ambience is the effect of the environment on the perception of sound. For example, song A played on radio X in a shower stall sounds very different from song A played on radio X in a concert hall. Network latency is the point to point transmission time delay induced by a network. A typical round-trip delay for present day global commodity Internet is from about 200 ms to about 500 ms, and this delay can vary significantly due to variability in network traffic and/or quality of service.

Real time audio collaboration in the presence of such large time delays is difficult, if not impossible, so special methods have been proposed for collaboration in the presence of large network latency. For example, U.S. Pat. No. 6,353,174 discusses network musical collaboration where a musical data stream is provided to multiple users, and each user is positioned at a different time within the data stream. The time separation between any two users exceeds the network latency. Each user is allowed to modify the portion of the data stream being played to that user. Although this approach eliminates the problem of conflicting modifications, it is far removed from an idealized collaboration environment which would closely mimic a conventional recording studio or other music space.

Fortunately, not all networks have as much latency as present-day commodity Internet, and in time even commodity Internet latency may decrease. For example, a Next Generation Internet (NGI) backbone link between two locations (Stanford University and Dallas) separated by about 1700 miles consistently provides a round-trip delay of about 45 ms. This time delay is dominated by propagation delay, so it will scale linearly with separation between the locations. Thus, networks having relatively short delays (especially round trip delays of 50 ms or less) can provide a wide area of coverage.

Since real time audio collaboration over such networks is not clearly ruled out by network delay, it is desirable to provide high fidelity real-time audio collaboration having a realistic ambience in the presence of as much network delay as possible. In this way, the applicability of such collaboration is maximized. However, this problem has not been considered in the art, so there is an unmet need in the art for distributed acoustic collaboration providing a realistic and shared acoustic ambience.

SUMMARY

The present invention provides a distributed acoustic reverberator including a network audio connection between at least two separated locations. When a sound is emitted at one of the locations, the reverberator provides a reverberation signal to that location with a procedure. An algorithm implemented by the distributed reverberator includes such a procedure for each location. The delay of the network connection is an input to the procedures. Thus, a shared and acoustically consistent space including the separated locations is provided. Optionally, the reverberator includes procedures for providing a reverberation signal to one location responsive to sound at another location.

DETAILED DESCRIPTION

Figure 1:
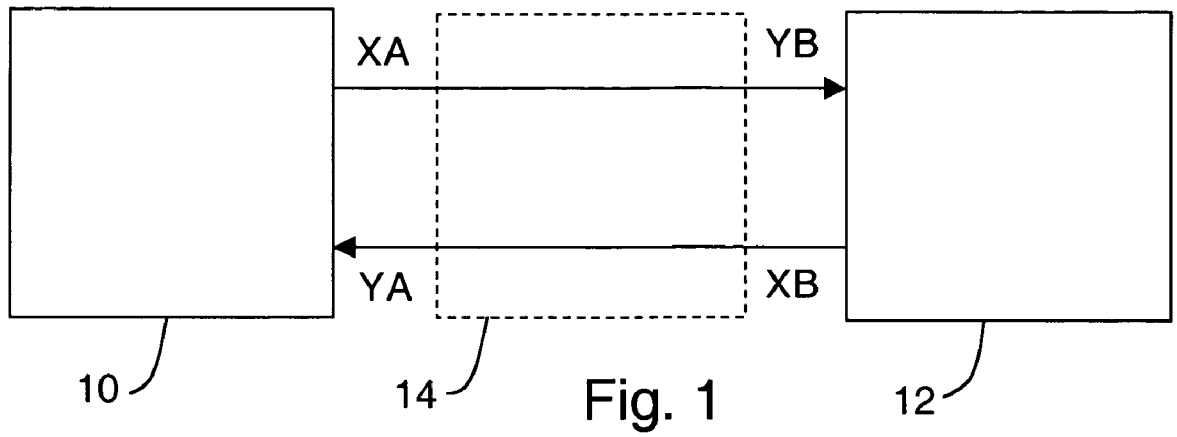
FIG. 1 shows two separated locations connected by a network audio connection.

FIG. 1 shows a first location 10 and a second location 12 which are spaced apart and connected over a network 14. Network 14 provides a bidirectional audio connection between locations 10 and 12, where output XA from location 10 is transmitted to input YB of location 12, and output XB from location 12 is transmitted to input YA of location 10. Network 14 can be any data communication network, such as a LAN, a WAN or the Internet. The audio data transmitted between locations 10 and 12 is preferably high fidelity audio data, e.g., 24 bit data sampled at 96 kHz, but transmission of any kind of audio data is suitable for practicing the invention.

Figure 2:
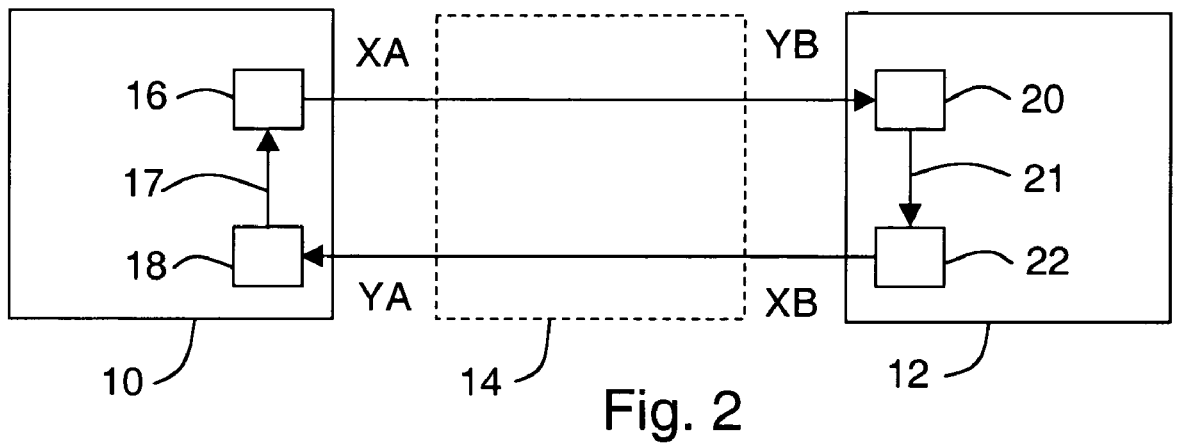
FIG. 2 shows further detail of the configuration of FIG. 1.

FIG. 2 shows acoustic inputs 16 and 22 within locations 10 and 12 respectively. Acoustic outputs 18 and 20 within locations 10 and 12 respectively are also shown. Inputs 16 and 22 can be microphones, while outputs 18 and 20 can be speakers or headphones. If output 18 and 20 are speakers, then typically acoustic feedback paths 17 and 21 will be present within locations 10 and 12 respectively, since inputs 16 and 22 are typically able to receive sound emitted by outputs 18 and 20 respectively. Thus a feedback path including the network audio connection is created between locations 10 and 12 on FIG. 2.

The perceived effect of the feedback shown on FIG. 2 depends on the round trip delay of the feedback path. For round trip delays of 100 ms or more, the feedback is perceived as providing an echo, while for round trip delays between about 20 ms and about 50 ms the feedback is perceived as a "ringing" superimposed on an audio signal. Echo is nearly always an undesirable effect which must be removed. In the example of FIG. 2, the feedback loop can be broken by the use of headphones for one or both of outputs 18 and 20, to eliminate path 17 and/or 21.

However, one of the discoveries of the present invention is that the "ringing" provided by shorter round trip delays is not necessarily an undesirable effect which must be eliminated. One way to appreciate this discovery is to consider the propagation delay of sound in air, which is about 3 ms/m. A round trip network delay of 20 ms provides about the same delay as an additional 3 m of physical separation between locations 10 and 12. Thus, the possibility of synthesizing a shared and acoustically consistent environment including separated locations 10 and 12 arises. For example, assuming locations 10 and 12 are both 3 m rooms and a round trip network delay of 20 ms, the shared and acoustically consistent environment can be a 9 m long room. Listeners in locations 10 and 12 would have the impression of communicating with each other in the same 9 m room. In order to accomplish this goal, the "ringing" provided by the network delay should be replaced with a closer approximation to the acoustic reverberation expected from such an environment.

Figure 3:
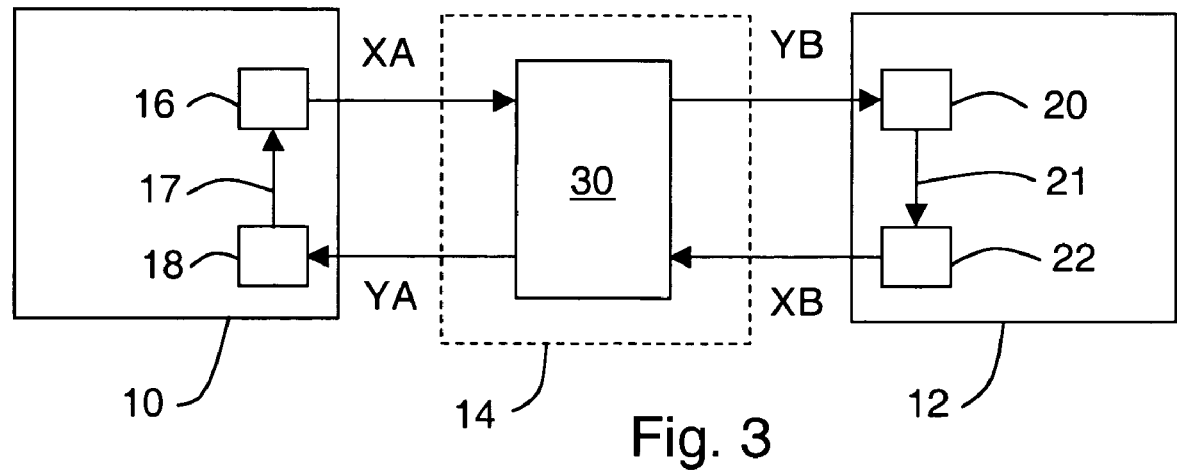
FIG. 3 shows two separated locations connected by a distributed audio reverberator in accordance with an embodiment of the invention.
Figure 4:
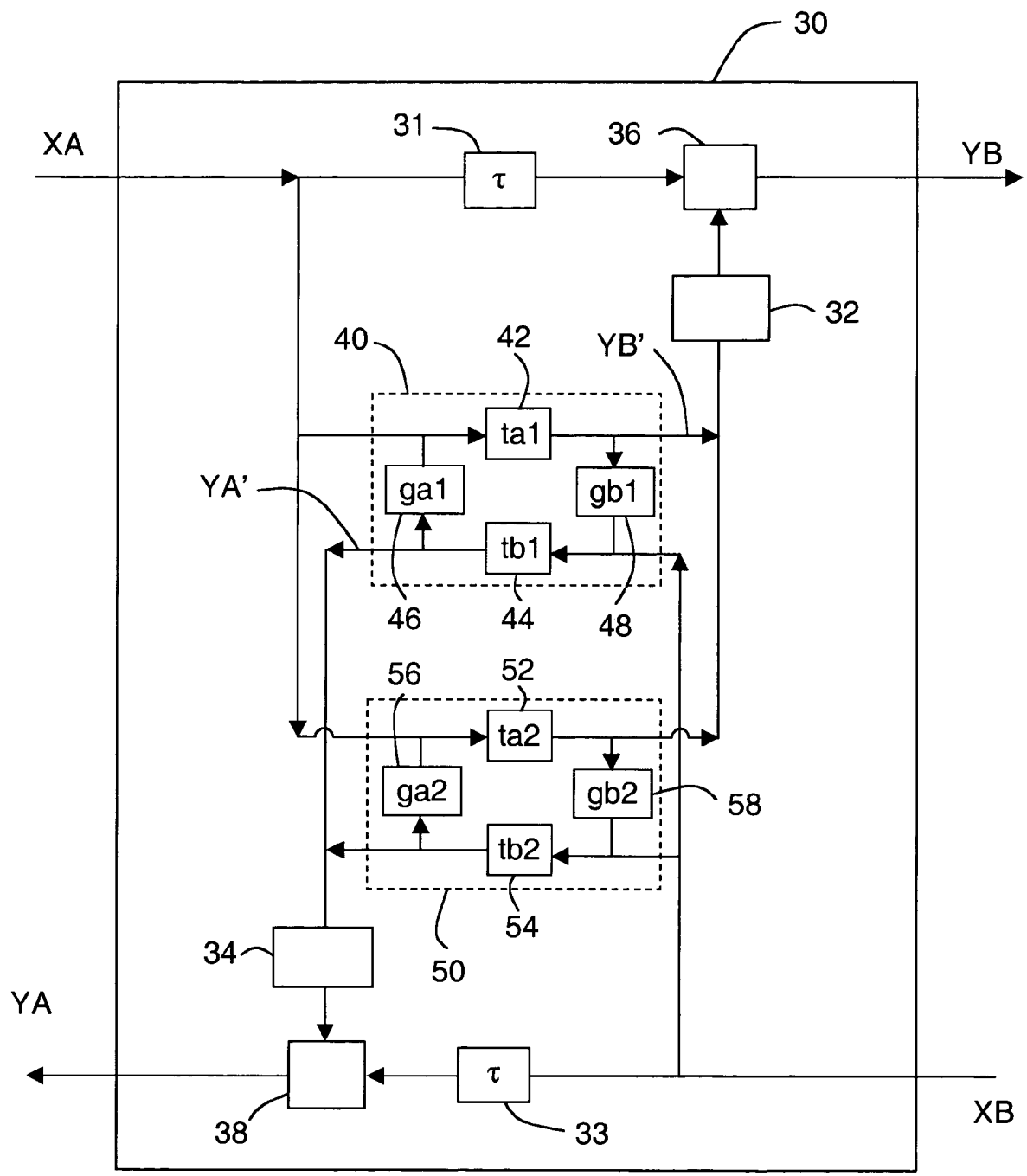
FIG. 4 shows a distributed audio reverberator in accordance with an embodiment of the invention.

FIG. 3 shows the configuration of FIG. 2 with the addition of a distributed reverberator 30, and FIG. 4 shows a more detailed view of distributed reverberator 30 according to an embodiment of the invention. Output XA from location 10 is received by reverberator 30. Within reverberator 30, output XA is received by a mixer 36 and by comb filters 40 and 50 arranged in parallel. A (one way) network delay 31 of duration $\tau$ is experienced by XA as it propagates to mixer 36. The combined (i.e. summed) output of comb filters 40 and 50 is also received by mixer 36, after passing through filter 32. Mixer 36 performs a conventional "wet/dry" mixing function, where the dry (i.e., unprocessed) signal path is through time delay 31, and the wet (i.e. processed) signal path is through filter 32. Thus 100% dry corresponds to setting the output of mixer 36 equal to the output of delay 31, while 100% wet corresponds to setting the output of mixer 36 equal to the output of filter 32. The output of mixer 36 is input YB to location 12.

Similarly, output XB from location 12 is received by reverberator 30. Within reverberator 30, output XB is received by a mixer 38 and by comb filters 40 and 50 arranged in parallel. A (one way) network delay 33, also of duration $\tau$, is experienced by XB as it propagates to mixer 38. The combined outputs of comb filters 40 and 50 is also received by mixer 38, after passing through filter 34. Mixer 38 also performs a conventional "wet/dry" mixing function, where the dry (i.e., unprocessed) signal path is through time delay 33, and the wet (i.e. processed) signal path is through filter 34. The output of mixer 38 is input YA to location 10.

Figure 5A:
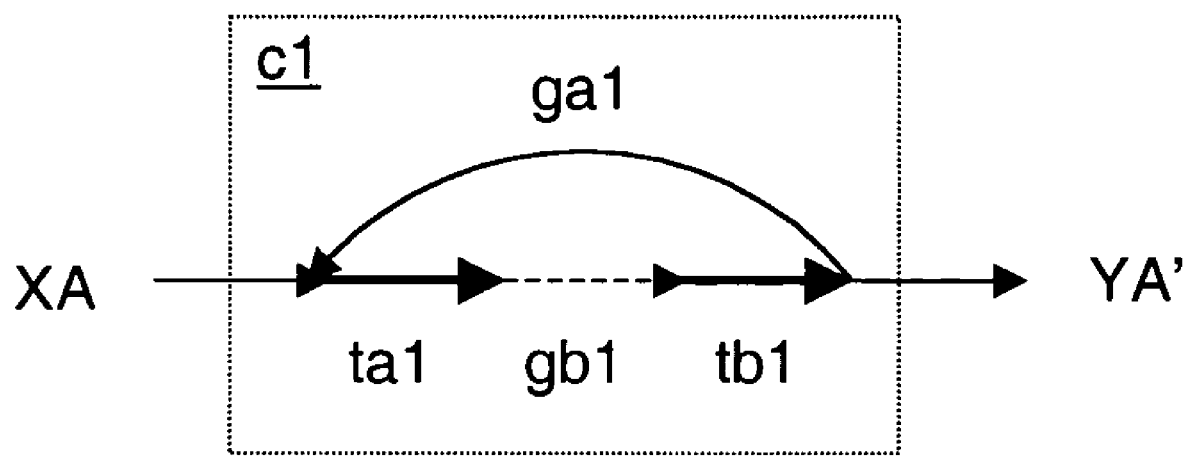
FIGS. 5a and 5b are signal flow graphs for bidirectional comb filters present in the embodiment of FIG. 4.
Figure 5B:
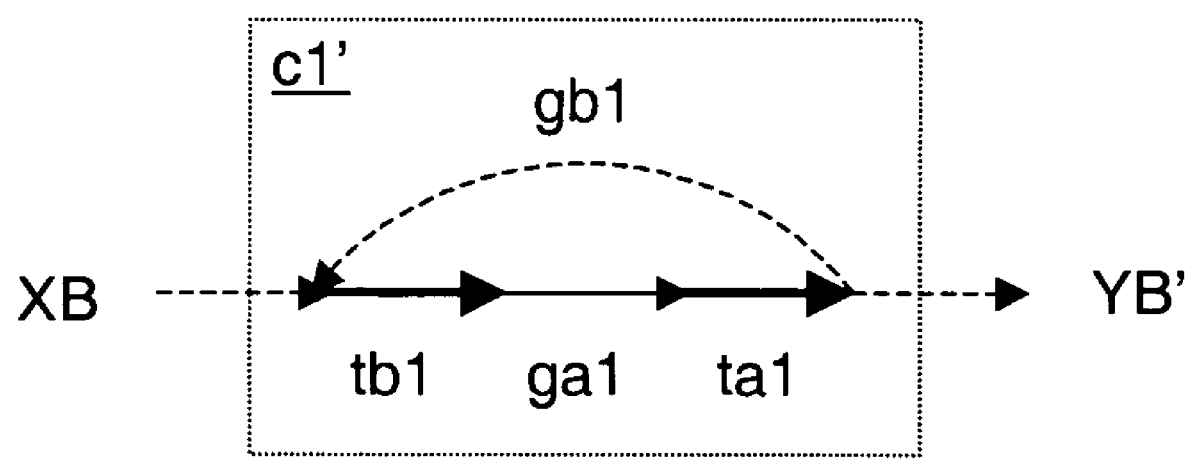

The operation of comb filter 40 on FIG. 4 is best appreciated in connection with the signal flow graphs of FIGS. 5a and 5b. FIG. 5a is a signal flow graph for comb filter 40 having an input XA and an output YA'. Within comb filter 40, input XA first encounters a time delay ta1 (42 on FIG. 4), then encounters a gain gb1 (48 on FIG. 4), and then encounters a second time delay tb1 (44 on FIG. 4). The output of time delay tb1 is fed back to the filter input with a feedback gain ga1 (46 on FIG. 4). The output YA' of comb filter 40 is taken from the output of time delay tb1. Heavy lines on FIG. 5a correspond to signal flow between locations 10 and 12 (i.e., across the network connection), solid lines on FIG. 5a correspond to signal flow on the location 10 side of the network connection, and dashed lines on FIG. 5a correspond to signal flow on the location 12 side of the network connection. The overall structure of the signal flow graph of FIG. 5a is a closed-loop circuit having feedback around a delay line, which is a comb filter c1 having input XA and output YA'.

FIG. 5b is a signal flow graph for comb filter 40 having an input XB and an output YB'. Within comb filter 40, input XB first encounters time delay tb1, then encounters gain ga1, and then encounters time delay ta1. The output of time delay ta1 is fed back to the filter input with a feedback gain gb1. The output YB' of comb filter 40 is taken from the output of time delay ta1. Heavy lines on FIG. 5b correspond to signal flow between locations 10 and 12 (i.e., across the network connection), solid lines on FIG. 5b correspond to signal flow on the location 10 side of the network connection, and dashed lines on FIG. 5b correspond to signal flow on the location 12 side of the network connection. The overall structure of the signal flow graph of FIG. 5b is a closed-loop circuit having feedback around a delay line, which is a comb filter c1' having input XB and output YB'.

Thus comb filter 40 on FIG. 4 is a bidirectional comb filter, which provides comb filter c1 of FIG. 5a to location 10, and provides comb filter c1' of FIG. 5b to location 12. Comb filters c1 and c1' provided by comb filter 40 can be made identical, by setting ga1=gb1 and ta1=tb1. Alternatively, comb filters c1 and c1' can be made distinct, by setting ga1 and gb1 and/or ta1 and tb1 to different values. Time delays ta1 and tb1 include the one-way network delay $\tau$, and are thus greater than or equal to $\tau$.

Comb filter 50 on FIG. 4 operates in the same way as comb filter 40 on FIG. 4. Comb filters 40 and 50 on FIG. 4 are connected in parallel, and any number of bidirectional comb filters can be added in parallel to comb filters 40 and 50 in the configuration of FIG. 4. The time delays and loop gains of such a bank of parallel comb filters are individually adjustable, since each comb filter has its own elements. For example, elements 42, 44, 46, and 48 of comb filter 40 are separate from elements 52, 54, 56, and 58 of comb filter 50.

Figure 6A:
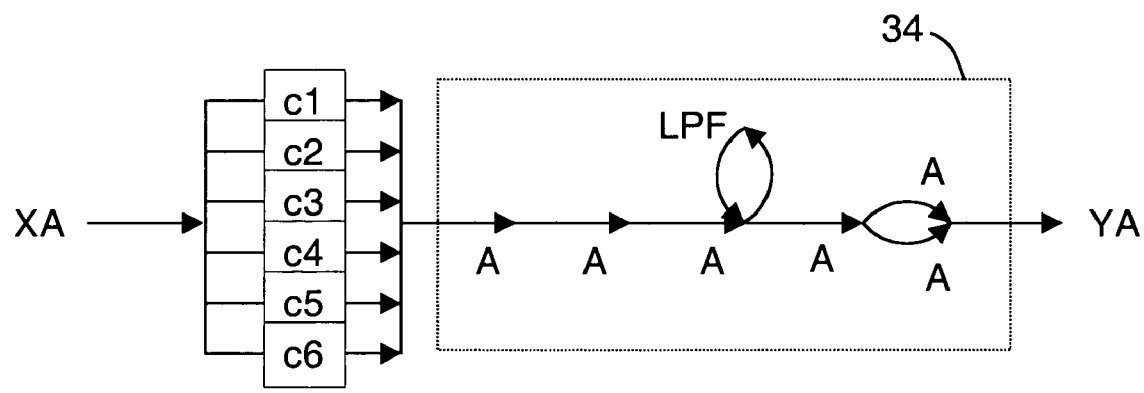
FIGS. 6a and 6b are signal flow graphs for a distributed audio reverberator in accordance with an embodiment of the invention.
Figure 6B:
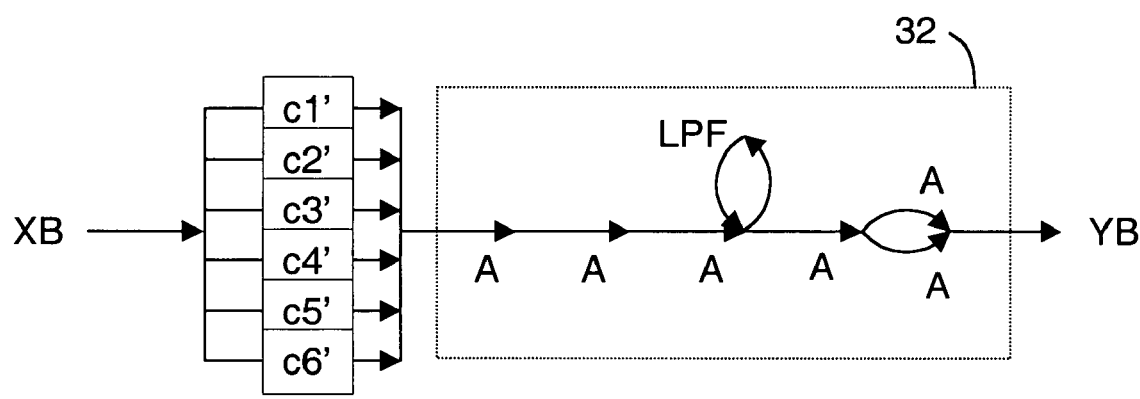

Bidirectional comb filters such as 40 and 50 on FIG. 4 are useful building blocks for a distributed audio reverberator according to an embodiment of the invention. For example, FIGS. 6a and 6b are signal flow graphs for a distributed audio reverberator in accordance with this embodiment of the invention. FIG. 6a shows a signal flow graph for a reverberator having input XA and output YA. A bank of six comb filters c1, c2, c3, c4, c5, c6 is arranged in parallel, and then the output of the bank of comb filters is passed through a succession of all-pass delays A and a low pass filter LPF. As indicated by the dotted box on FIG. 6a, the all-pass delays and low pass filter are included in filter 34 on FIG. 4. The bank of comb filters c1, c2, c3, c4, c5, c6 is provided by six parallel bidirectional comb filters such as 40 and 50 on FIG. 4.

Similarly, FIG. 6b shows a signal flow graph for a reverberator having input XB and output YB. A bank of six comb filters c1', c2', c3', c4', c5', c6' is arranged in parallel, and then the output of the bank of comb filters is passed through a succession of all-pass delays A and a low pass filter LPF. As indicated by the dotted box on FIG. 6b, the all-pass delays and low pass filter are included in filter 32 on FIG. 4. The bank of comb filters c1', c2', c3', c4', c5', c6' is provided by the same six parallel bidirectional comb filters that provide comb filters c1, c2, c3, c4, c5, c6 on FIG. 6a. The signal flow graphs of FIGS. 6a and 6b show a Schroeder-style reverberator, which is a widely used reverberator circuit. All comb filter channels are preferably transmitted across the network connection in multi-channel sample frames to ensure synchronicity (i.e., to ensure the contribution of network delay to filter delay is identical for all comb filters).

For Schroeder-style reverberators, such as shown on FIGS. 6a and 6b, the time delays of the bank of parallel comb filters are distinct. Thus time delays such as ta1, tb1, ta2, and tb2 on FIG. 4 include delays in addition to the network delay τ to provide such distinct time delays. For example, the comb filter delays in one Schroeder-style reverberator design are 55, 62, 72, 80, 87, and 93 ms. Assuming a one-way network time delay of 25 ms, additional (one-way) time delays of 2.5, 6, 11, 15, 18.5, and 21.5 ms will provide the comb filter delays of the above design.

In operation, the distributed reverberator of FIGS. 6a and 6b provides synthetic reverberation to both locations 10 and 12. It is convenient to refer to two reverberation procedures implemented by the distributed reverberator, one procedure for location 10 and the other procedure for location 12. The location 10 procedure defines the input-output relation between input sound at location 10 and an output reverberation signal provided to location 10, and similarly for the location 12 procedure. The distributed reverberator of FIGS. 6a and 6b can effectively position locations 10 and 12 consistently within a larger synthetic acoustic space, by appropriate selection of the two procedures for locations 10 and 12. Typically, the two reverberation procedures differ, since the locations and/or listening positions within the locations usually differ. Only in the case of identical locations with identical listening positions should the two reverberation procedures be the same.

In practice, the distributed reverberator often has time delays which are long compared to typical early reflection delay times. Thus, locations 10 and 12 retain their real-room cues in the immediate vicinity of the respective listening positions (due to real-world early reflections at each location). Alternatively, the distributed reverberator can provide time delays comparable to or even shorter than typical early reflection delay times.

In order to provide a detailed example of an embodiment of the invention, many specifics are included in the preceding description which are not required to practice the invention. More generally, an embodiment of the invention is a distributed acoustic reverberator including a network audio connection between at least two separated locations and circuitry for implementing a reverberation algorithm. When a sound is emitted at one of the locations, the reverberator provides a reverberation signal to that location with a procedure. The reverberation algorithm includes such a procedure for each location. The delay of the network connection is an input to the procedures. As indicated above, a reverberation signal can have any delay. Thus the reverberation provided by the present invention is not limited to large delays corresponding to late reflections, but can include small delays corresponding to early reflections.

Provision of reverberation signals having short time delays with a distributed reverberator is straightforward if the network delay is less than the desired short delay time. Alternatively, a hybrid system can be implemented, where a local reverberation signal having short time delays is provided by local processing (i.e., not including a network delay), while a distributed reverberation signal having longer time delays is provided by a distributed reverberator including a network delay.

The preceding examples discuss a Schroeder-style reverberation method making use of comb filters having time delays. Any other Schroeder-style reverberation method is also suitable for practicing the invention. For example, the order of filter elements on FIGS. 6a and 6b can be rearranged, and/or some or all of the all-pass delay elements can include a network delay. Furthermore, any other reverberation method having a time delay as a parameter is also suitable for practicing the invention, since the network delay can be incorporated into the time delay parameter. Convolutional reverberation and waveguide reverberation are two such methods.

Convolutional reverberation methods are based on convolving the source sound with an approximate ambient impulse response. A network version of convolutional reverberation requires time shifting the ambient impulse response to earlier times by an amount equal to the network delay. This is clearly limited to cases where the network delay is less than the time duration of the impulse response. However, if the network delay is less than sound path delays that provide prominent features in the impulse response, such time shifting of the impulse response has a minimal effect on fidelity.

Waveguide reverberation methods explicitly simulate the major propagation paths between each input and output with a 2-D or 3-D waveguide mesh. A network version of waveguide reverberation can be designed with the explicit geometry of the shared synthetic space in mind, and to explicitly incorporate network delays. Rather than using the more abstract signal-based approach of a Schroeder-style reverberator or the nonparametric snapshots of a convolutional reverberator, a waveguide approach directly models the physical aspects of the intended space allowing parametric adjustment within a physically meaningful representation. All of these reverberation methods can be thought of as providing various ways to implement network delay filters for acoustic signal processing.

Figure 7:
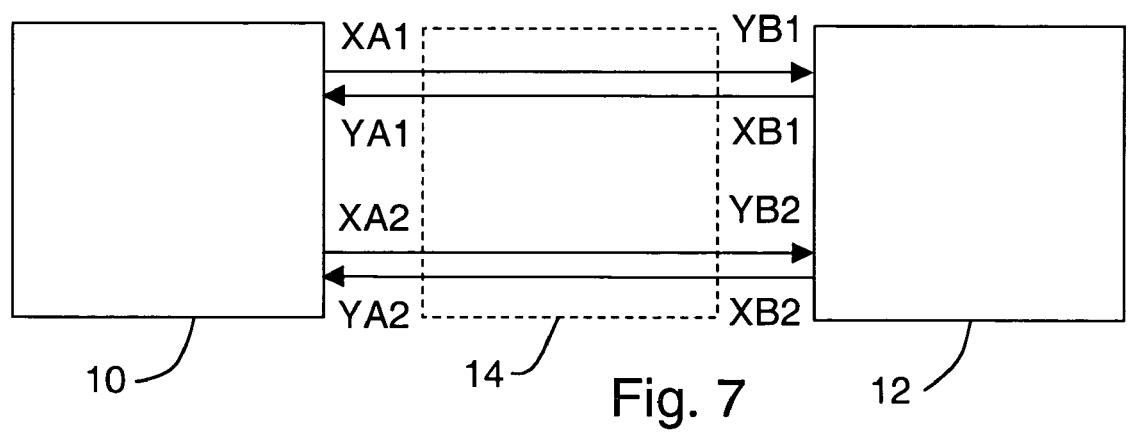
FIG. 7 shows two separated locations connected by a multi-channel network audio connection.

FIG. 7 shows a multi-channel audio connection between locations 10 and 12 through network 14. The present invention is also applicable to such a configuration. A distributed reverberator as shown on FIGS. 6a and 6b can be implemented for each acoustic channel between locations 10 and 12. The total bandwidth requirement for such a scenario is relatively modest. For example, assume there are N top-level channels between locations 10 and 12, each of which includes a reverberator having M parallel comb filters. The total number of channels is N(M+1), where the "+1" accounts for the direct (or "dry") path shown on FIG. 4. For N=8 top-level channels, and M=8 comb filter channels per reverberator, the total number of channels is 72, and if each channel is 24 bits sampled at 48 kHz (i.e., 1.15 Mb/s), the total bandwidth is 83 Mb/s.

Figure 8:
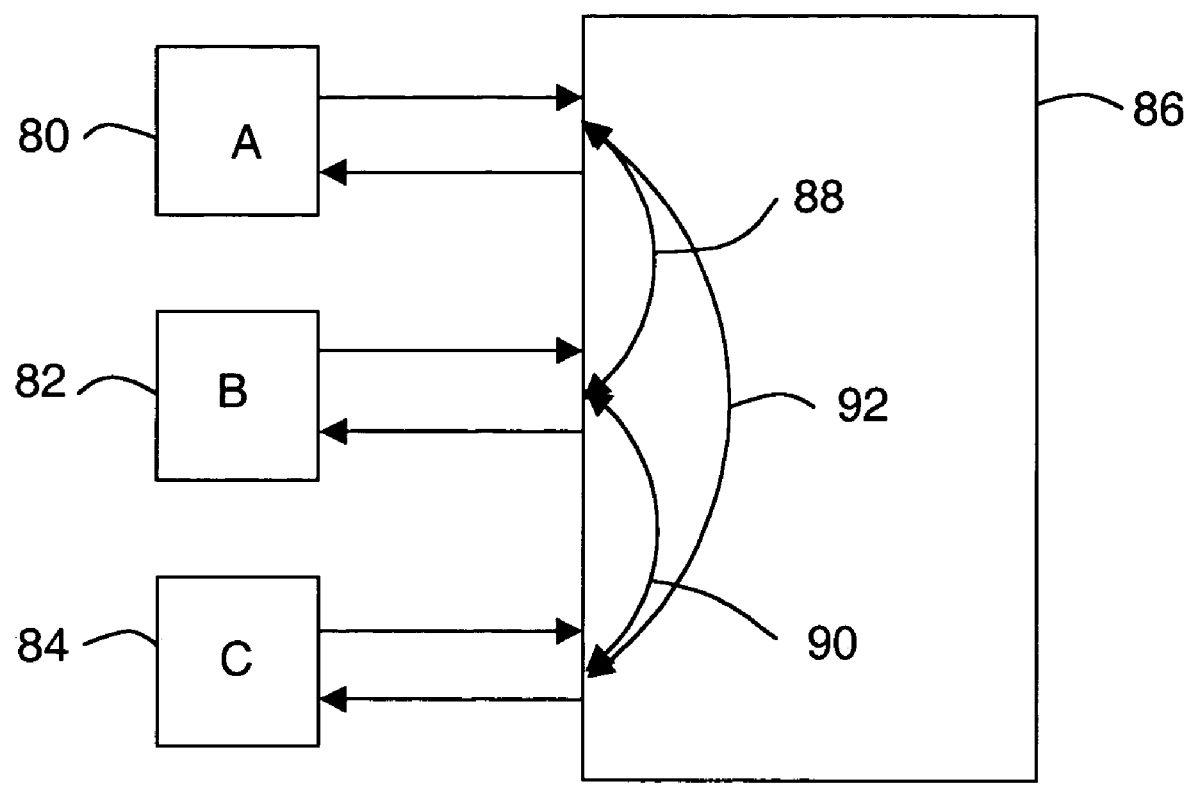
FIG. 8 shows three separated locations connected by network audio connections.

FIG. 8 shows three locations 80 (A), 82 (B), and 84 (C) connected through a network 86. Network 86 can provide link 88 between locations A and B, link 90 between locations B and C, and link 92 between locations A and C. At least two of links 88, 90, and 92 must be present to provide connectivity between locations A, B and C. The present invention is also applicable to such a configuration having more than two separated locations connected via a network. A distributed reverberator can be connected to locations A, B, and C, where the time delays of links 88, 90, and/or 92 are included in the procedures for providing a reverberation signal at location A responsive to a sound at location A (and similarly for locations B and C).

Figure 9A:
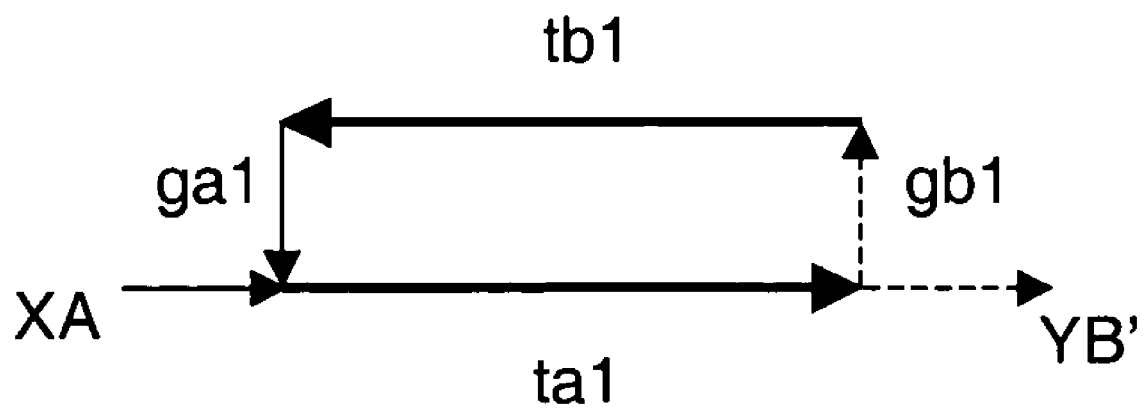
FIGS. 9a and 9b are additional signal flow graphs for bidirectional comb filters present in the embodiment of FIG. 4.
Figure 9B:
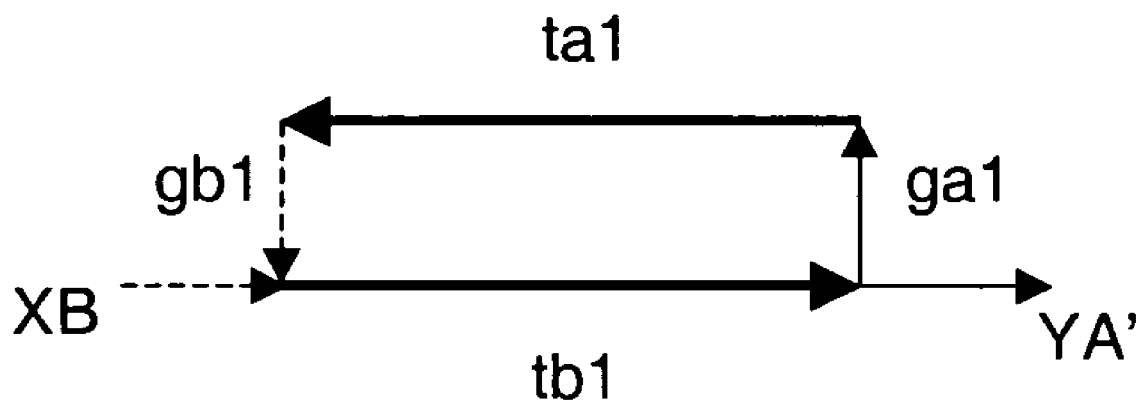

Since comb filters 40 and 50 on FIG. 4 are bidirectional, they provide processing for signals received at location 12 responsive to sounds at location 10 (and vice versa). FIG. 9a is a signal flow graph for comb filter 40 between input XA from location 10 and output YB' which is received at location 12. FIG. 9b is a signal flow graph for comb filter 40 between input XB from location 12 and output YA' which is received at location 10. Thus FIGS. 9a and 9b represent network comb filters, as do FIGS. 5a and 5b. In a network comb filter, an audio signal travels in a loop including a delay line having a network delay. An audio input mixes signals into the loop and an audio output tap receives the filter output. The loop can include optional additional elements, such as a low-pass filter or an attenuator. The loop can also include multiple inputs and multiple output taps, as in the case of FIGS. 9a and 9b, which can correspond to the structure of a digital waveguide. Thus the wet (or processed) signal paths on FIG. 4 include paths from location 10 to location 12 (and vice versa), in addition to the previously discussed paths from location 10 to location 10 and from location 12 to location 12.

Providing such processing for signals traveling from one location to another location can be useful for increasing the realism of a synthetic acoustical ambience by adding synthetic early reflections and/or longer echoes for signals arriving from a remote location. Such processing, which can add musical or otherwise useful attributes to sound, can also be used for other purposes as well. One example is echo construction, which can be used to add a recirculating (rhythmic) delay effect to a guitar or to add a cavernous sound effect to a voice.

In the embodiment of FIG. 4, ipsilateral signal processing (input and output on the same side of the connection) and contralateral signal processing (input and output on opposite sides of the connection) are related since the same hardware is used for both signal processing functions. This approach has the advantage of reduced resource requirements compared to an alternative, and more flexible, approach where ipsilateral processing and contralateral processing are performed with two independent systems. The invention can be practiced with common and/or independent ipsilateral and contralateral signal processing. Common ipsilateral and contralateral processing entails the use of bidirectional network delay filters, as in FIG. 4, while independent ipsilateral and contralateral processing can be performed with unidirectional network delay filters.

What is claimed is:

1. A method for distributed acoustic reverberation synthesis, the method comprising:
    a) establishing a network audio connection between a first location and a second location separated from said first location, said connection having a network delay; and
    b) providing a reverberation algorithm including:
        i) a first procedure for providing a circuitry for implementing a first reverberation signal to said first location responsive to a first sound at said first location; and
        ii) a second procedure for providing a second reverberation signal to said second location responsive to a second sound at said second location;
    wherein said network delay is an input to said first procedure, and wherein said network delay is an input to said second procedure.

2. The method of claim 1, further comprising establishing at least one additional network audio connection to at least one additional location separated from said first and second locations.

3. The method of claim 2, wherein said reverberation algorithm further includes an additional procedure for providing an additional reverberation signal to one of said additional locations responsive to a sound at said one of said additional locations.

4. The method of claim 3, wherein a delay of said additional network audio connection is an input to said additional procedure.

5. The method of claim 1, wherein said network delay is less than about 50 ms for a round trip between said first and second locations.

6. The method of claim 1, wherein said first and second procedures are substantially the same.

7. The method of claim 1, wherein said first and second procedures are substantially different.

8. The method of claim 1, wherein said reverberation algorithm comprises a Schroeder-style reverberation method including at least one comb filter.

9. The method of claim 8, wherein a delay element of said comb filter includes said network delay.

10. The method of claim 1, wherein said reverberation algorithm comprises a convolutional reverberation method.

11. The method of claim 1, wherein said reverberation algorithm comprises a waveguide reverberation method.

12. The method of claim 1, further comprising establishing at least one additional network audio connection between said first and second locations, whereby a multi-channel audio connection is established between said first and second locations.

13. The method of claim 12, wherein a delay of said additional network audio connection is an input to said reverberation algorithm.

14. The method of claim 1, wherein said first and second procedures are selected to provide acoustic consistency between said first and second locations, and wherein said acoustic consistency includes an impression of altered location sizes for said first and second locations.

15. The method of claim 1, wherein said reverberation algorithm further includes:
    iii) a third procedure for providing a third reverberation signal to said first location responsive to said second sound; and
    iv) a fourth procedure for providing a fourth reverberation signal to said second location responsive to said first sound;
    wherein said network delay is an input to said third procedure, and wherein said network delay is an input to said fourth procedure.

16. A distributed acoustic reverberator comprising:
    a) a network audio connection between a first location and a second location separated from said first location, said connection having a network delay; and
    b) circuitry implementing a reverberation algorithm, the algorithm including:
        i) a first procedure for providing a first reverberation signal to said first location responsive to a first sound at said first location; and
        ii) a second procedure for providing a second reverberation signal to said second location responsive to a second sound at said second location;
    wherein said network delay is an input to said first procedure, and wherein said network delay is an input to said second procedure.

17. The reverberator of claim 16, further comprising at least one additional network audio connection to at least one additional location separated from said first and second locations.

18. The reverberator of claim 17, wherein said reverberation algorithm further includes an additional procedure for providing an additional reverberation signal to one of said additional locations responsive to a sound at said one of said additional locations.

19. The reverberator of claim 18, wherein a delay of said additional network audio connection is an input to said additional procedure.

20. The reverberator of claim 16, wherein said network delay is less than about 50 ms for a round trip between said first and second locations.

21. The reverberator of claim 16, wherein said first and second procedures are substantially the same.

22. The reverberator of claim 16, wherein said first and second procedures are substantially different.

23. The reverberator of claim 16, wherein said reverberation algorithm comprises a Schroeder-style reverberation method including at least one comb filter.

24. The reverberator of claim 23, wherein a delay element of said comb filter includes said network delay.

25. The reverberator of claim 16, wherein said reverberation algorithm comprises a convolutional reverberation method.

26. The reverberator of claim 16, wherein said reverberation algorithm comprises a waveguide reverberation method.

27. The reverberator of claim 16, further comprising at least one additional network audio connection between said first and second locations, whereby a multi-channel audio connection is established between said first and second locations.

28. The reverberator of claim 27, wherein a delay of said additional network audio connection is an input to said reverberation algorithm.

29. The reverberator of claim 16, wherein said first and second procedures are selected to provide acoustic consistency between said first and second locations, and wherein said acoustic consistency includes an impression of altered location sizes for said first and second locations.

30. The reverberator of claim 16, wherein said reverberation algorithm further includes:
  iii) a third procedure for providing a third reverberation signal to said first location responsive to said second sound; and
  iv) a fourth procedure for providing a fourth reverberation signal to said second location responsive to said first sound;
  wherein said network delay is an input to said third procedure, and wherein said network delay is an input to said fourth procedure.

* * * * *

UNITED STATES PATENT AND TRADEMARK OFFICE
CERTIFICATE OF CORRECTION

| | | |
|---|---|---|
| PATENT NO. | : 7,522,734 B2 | Page 1 of 1 |
| APPLICATION NO. | : 10/756741 | |
| DATED | : April 21, 2009 | |
| INVENTOR(S) | : Chris Chafe | |

It is certified that error appears in the above-identified patent and that said Letters Patent is hereby corrected as shown below:

In the Specification Under Column 1:

Please insert at line 1:

--FEDERALLY-SPONSORED RESEARCH OR DEVELOPMENT
This invention was made with Government support under contract 9977246 awarded by the National Science Foundation. The Government has certain rights in this invention.--

Signed and Sealed this
Tenth Day of September, 2013

Teresa Stanek Rea
*Acting Director of the United States Patent and Trademark Office*